US006341269B1

United States Patent
Dulaney et al.

(10) Patent No.: US 6,341,269 B1
(45) Date of Patent: Jan. 22, 2002

(54) SYSTEM, METHOD AND ARTICLE OF MANUFACTURE TO OPTIMIZE INVENTORY AND MERCHANDISING SHELF SPACE UTILIZATION

(75) Inventors: Earl F. Dulaney; Matthew A. Waller, both of Fayetteville, AR (US)

(73) Assignee: Mercani Technologies, Inc., Fayetteville, AK (US)

( * ) Notice: Subject to any disclaimer, the term of this patent is extended or adjusted under 35 U.S.C. 154(b) by 0 days.

(21) Appl. No.: 09/475,612

(22) Filed: Dec. 30, 1999

Related U.S. Application Data

(60) Provisional application No. 60/117,749, filed on Jan. 26, 1999.

(51) Int. Cl.⁷ .............................................. G06F 17/60
(52) U.S. Cl. ................................ 705/22; 705/7; 705/8; 705/28
(58) Field of Search ............................ 705/7, 8, 28, 22

(56) References Cited

U.S. PATENT DOCUMENTS

| | | | | |
|---|---|---|---|---|
| 3,705,410 A | * | 12/1972 | Kooy et al. ..................... | 705/8 |
| 4,947,322 A | * | 8/1990 | Tenma et al. .................. | 705/8 |
| 5,241,465 A | * | 8/1993 | Oba et al. ...................... | 705/8 |
| 5,241,467 A | * | 8/1993 | Failing et al. .................. | 705/1 |

(List continued on next page.)

FOREIGN PATENT DOCUMENTS

| | | | | |
|---|---|---|---|---|
| WO | 0639815 A2 | * | 8/1994 | ........... G06F/17/60 |
| WO | 0840245 A2 | * | 5/1998 | ........... G06F/17/60 |

OTHER PUBLICATIONS

Trunk, C.; Warehouse Management Systems won't Wait!, Material Handling Eng., v50n6 pp:53–66, Jun. 1995.*

Fancher, Lynne A.; Computerized Space Management: A Strategic Weapon Discount Merchandiser,Mar. 1992,vol. 31, Iss. 3; p. 64.*

Garry, Michael ;Managing Space from the Top; Progressive Grocer, New York; Mar. 1992; vol. 71, Iss. 3; p. 81, 3 pgs.*

Parrott Richard A.; Automated Space Planning for Warehousing, Transportation and Distribution, vol. 33, Iss. 7; Jul. 1992 pp 54–55.*

*Primary Examiner*—Vincent Millin
*Assistant Examiner*—Jagdish N Patel
(74) *Attorney, Agent, or Firm*—Hsad, Johnson & Kachigian

(57) ABSTRACT

The present invention relates to inventory management systems and processes at the retail, wholesale and/or distributor level. The present invention particularly involves a system, method and article of manufacture that optimizes inventory and merchandising shelf space utilization based upon cost and lost sales, with or without considering physical space constraints. In an exemplary embodiment, the system includes a bank of memory, a processor, an input and an output, and a computer program. The system optimizes inventory or store facings using various data and extrapolated computations. The system optimizes inventory using facing optimization which is an approach to shelf inventory management that minimizes the sum of expected annual cost of lost sales and expected annual inventory holding cost. The process of facing optimization requires the assimilation of relevant data for each particular item to be evaluated. The data to be collected include store-level point-of-sale (a.k.a., POS) data, frequency of shelf replenishment, shelf-level order cycle time, space available, space required per SKU, number of units per facing, cost to the retailer of one unit of SKU, price they sell it for, the inventory holding cost factor, and the unit cost of a lost sale. Store-level POS is used to measure the mean of daily sales and the variability of daily sales (a.k.a., standard deviation of demand). The system evaluates these variables when determining the optimal solution for an unconstrained space or a constrained space of a particular facility.

16 Claims, 7 Drawing Sheets

U.S. PATENT DOCUMENTS

| | | | | |
|---|---|---|---|---|
| 5,600,555 A | * | 2/1997 | Takahashi et al. | 705/1 |
| 5,608,621 A | | 3/1997 | Caveney et al. | 395/216 |
| 5,611,051 A | * | 3/1997 | Pirelli | 705/10 |
| 5,630,070 A | * | 5/1997 | Dietrich et al. | 705/8 |
| 5,845,258 A | * | 12/1998 | Kennedy | 705/8 |
| 5,946,662 A | * | 8/1999 | Ettl et al. | 705/8 |
| 5,963,918 A | * | 10/1999 | Reagan et al. | 705/28 |
| 6,044,361 A | * | 3/2000 | Kalagnanam et al. | 705/28 |

* cited by examiner

FIG. 4

| SKU | UPC | Cur# | Opr# | Cur Hold $ | Cur Lost $ | Cur Total $ | Cpt Hold $ | Cpt Lost $ | Cpt Total $ | Cur vs Opt | Alt Hold $ | Alt Lost $ | Alt Total $ | Cpt vs Alt | Cur vs Alt |
|---|---|---|---|---|---|---|---|---|---|---|---|---|---|---|---|
| Chocolate Flakes Cereal, 13.75 | 9423458 | 2 | 2 | $6 | $0 | $6 | $6 | $0 | $6 | $0 | $6 | $0 | $6 | $0 | $0 |
| Crispy Waffle Cereal, 13.75 | 8994401 | 2 | 2 | $7 | $0 | $7 | $7 | $0 | $7 | $0 | $7 | $0 | $7 | $0 | $0 |
| Private Label Fabric Softener Sheets, 80 count | 8901070 | 2 | 2 | $8 | $0 | $8 | $8 | $0 | $8 | $0 | $8 | $0 | $8 | $0 | $0 |
| Nonclog Fabric Softener Sheets, 80 count | 8763813 | 2 | 2 | $8 | $0 | $8 | $8 | $0 | $8 | $0 | $8 | $0 | $8 | $0 | $0 |
| Golden and Crispy Cereal, 18 oz | 8076482 | 2 | 2 | $9 | $1 | $10 | $10 | $0 | $10 | $0 | $10 | $1 | $10 | $0 | $0 |
| Raisin Nut Cereal, 16 oz | 8006220 | 2 | 2 | $9 | $5 | $14 | $14 | $0 | $14 | $0 | $14 | $5 | $14 | $0 | $0 |
| Raisin Nut Flake Cereal, 18 oz | 8005434 | 2 | 2 | $16 | $0 | $16 | $16 | $0 | $16 | $0 | $16 | $0 | $16 | $0 | $0 |
| Downie Dispenser | 7967950 | 2 | 1 | $4 | $0 | $4 | $2 | $0 | $2 | $(21) | $4 | $0 | $4 | $2 | $0 |
| Raisin Bran Cereal, 25 oz | 7407747 | 2 | 3 | $13 | $30 | $43 | $20 | $0 | $20 | $(20) | $13 | $23 | $43 | $20 | $0 |
| Downie Mtn Spring Refill, 40 oz | 7393172 | 3 | 1 | $10 | $0 | $10 | $3 | $0 | $3 | $(33) | $10 | $0 | $10 | $7 | $0 |
| Alphabet Shaped Cereal, 14 oz | 7283615 | 3 | 2 | $35 | $0 | $35 | $11 | $0 | $11 | $(24) | $35 | $0 | $35 | $24 | $0 |
| Purella Dry Bleach, 80 oz | 7208846 | 2 | 2 | $5 | $0 | $5 | $5 | $0 | $5 | $0 | $5 | $0 | $5 | $0 | $0 |
| Downie April Fresh Fabric Softener, 20 oz | 6765308 | 3 | 3 | $8 | $0 | $8 | $5 | $0 | $5 | $(3) | $8 | $0 | $8 | $3 | $0 |
| Chocolate Cookie Cereal, 12 oz | 6120792 | 2 | 2 | $12 | $17 | $29 | $21 | $11 | $21 | $(8) | $12 | $17 | $29 | $8 | $0 |
| Crunchy Bananna and Nut Cereal, 13.5 oz | 6112364 | 2 | 3 | $26 | $0 | $26 | $15 | $2 | $15 | $(11) | $26 | $0 | $26 | $11 | $0 |
| Downie Tropical Bloom Fabric Softener, 60 oz | 5625790 | 3 | 3 | $20 | $0 | $20 | $13 | $0 | $13 | $(7) | $20 | $0 | $20 | $7 | $0 |
| Flounce Fabric Softener Sheets, 120 count | 5619709 | 1 | 1 | $26 | $0 | $26 | $26 | $0 | $26 | $0 | $26 | $0 | $26 | $0 | $0 |
| Downie April Fresh Fabric Softener Sheets, 80 count | 5507337 | 2 | 2 | $36 | $0 | $36 | $16 | $0 | $16 | $(19) | $36 | $0 | $36 | $19 | $0 |
| Downie Mtn Spring Refill, 60 oz | 5347702 | 3 | 3 | $16 | $0 | $16 | $15 | $0 | $15 | $(1) | $16 | $0 | $16 | $1 | $0 |
| Cuddle Fresh Rain Refill, 60 oz | 5045276 | 5 | 5 | $18 | $0 | $18 | $10 | $0 | $10 | $(8) | $18 | $0 | $18 | $8 | $0 |
| Cocoa Flavored Puffed Cereal, 17 oz | 4659657 | 3 | 1 | $30 | $0 | $30 | $12 | $0 | $12 | $(18) | $30 | $0 | $30 | $18 | $0 |
| Frosted Alphabet Shaped Cereal, 14 oz | 4607998 | 3 | 2 | $30 | $0 | $30 | $19 | $0 | $19 | $(11) | $30 | $0 | $30 | $11 | $0 |
| Private Label Fabric Softener Sheets, 40 count | 4517371 | 2 | 1 | $7 | $0 | $7 | $3 | $0 | $3 | $(3) | $7 | $0 | $7 | $3 | $0 |
| Raisin Bran Cereal, 20 oz | 4414550 | 2 | 2 | $22 | $0 | $22 | $22 | $0 | $22 | $0 | $22 | $0 | $22 | $0 | $0 |
| Cuddle Spring Blossom Refill, 40 oz | 4200369 | 4 | 3 | $4 | $0 | $4 | $0 | $0 | $0 | $(4) | $4 | $0 | $4 | $4 | $0 |
| Halloween Honey Flavor Shapes Cereal | 3941493 | 2 | 2 | $15 | $0 | $15 | $15 | $0 | $15 | $0 | $15 | $0 | $15 | $0 | $0 |
| Cuddle Fresh Rain Refill, 40 oz | 3937634 | 3 | 3 | $8 | $0 | $8 | $5 | $0 | $5 | $(3) | $8 | $0 | $8 | $3 | $0 |
| Roasted Honey and Nuts Cereal, 16 oz | 3756009 | 2 | 2 | $15 | $3 | $19 | $19 | $0 | $19 | $0 | $15 | $3 | $19 | $4 | $0 |
| Private Label Fabric Softener, 40 oz | 3612420 | 4 | 3 | $5 | $0 | $5 | $4 | $0 | $4 | $(1) | $5 | $0 | $5 | $1 | $0 |
| Toasted Oats Cereal, 12 oz | 3592406 | 3 | 3 | $19 | $6 | $25 | $25 | $0 | $25 | $0 | $19 | $6 | $25 | $0 | $0 |
| Cuddle Snuggle-Up Fresh Softener, 60 oz | 3560663 | 3 | 2 | $17 | $0 | $17 | $11 | $0 | $11 | $(6) | $17 | $0 | $17 | $6 | $0 |
| Bran Flakes Cereal, 16 oz | 3519157 | 2 | 3 | $16 | $16 | $33 | $26 | $1 | $26 | $(7) | $17 | $16 | $30 | $7 | $0 |
| American Grains Cereal, 13.5 oz | 3485402 | 2 | 1 | $29 | $0 | $29 | $14 | $0 | $14 | $(15) | $29 | $0 | $29 | $15 | $0 |
| Downie Mtn Spring Fabric Softener, 40 oz | 3376545 | 3 | 3 | $11 | $0 | $12 | $12 | $0 | $12 | $0 | $12 | $0 | $12 | $0 | $0 |
| Total Records: 58 | | 159 | 118 | $990 | $132 | $1122 | $666 | $60 | $726 | $(396) | $390 | $132 | $1122 | $336 | $0 |

FIG. 5

SYSTEM, METHOD AND ARTICLE OF MANUFACTURE TO OPTIMIZE INVENTORY AND MERCHANDISING SHELF SPACE UTILIZATION

This application is a continuation-in-part of prior U.S. Provisional Application Serial No. 60/117,749 entitled STORE LEVEL OPTIMIZATION SYSTEM filed on Jan. 26, 1999.

The present invention relates generally to inventory management systems and processes at the retail, wholesale and/or distributor level. In particular, the present invention involves a system, method and article of manufacture that optimizes inventory and merchandising shelf space utilization based upon cost and lost sales, with or without considering physical space constraints.

As will be understood by those skilled in the art, efficient inventory control is a critical ingredient in the success or failure of many businesses. As a primary cost of business is often inventory maintained at a business facility, it is important that inventory levels and control be handled in a cost effective manner. Successful operations typically generate a positive return on their investment in such inventory with higher sales or fewer lost sales. Thus, methods of controlling inventory are of critical importance to a business enterprise.

Inventory control methods may be broadly categorized as either reactionary or preemptive. In the preemptive category, an inventory control person or manager (i.e., store managers, parts managers, quartermasters, comptrollers, controllers, chief financial officers, or other persons charged with maintaining inventory) tries to anticipate demand based on known criteria (i.e., changing seasons, approaching holidays, etc.). In the reactionary category, the inventory manager reacts to perceived shortages of existing inventory to address demand. The latter technique is typically employed by many retail businesses in daily operation.

Current replenishment models are centered on providing order quantities which simply offer a probability of being in stock during the replenishment cycle, but do not take into account the sum of holding costs and the cost of lost sales due to stock outs. These systems project demand and store order quantities, but offer little or no insight into tradeoffs associated with the cost of carrying the inventory and the cost of stocking outs.

Determining the quantities of product to carry on the shelf (facings) is typically a totally separate process from replenishment methods, and rule-of-thumb principles are often used to determine numbers of facings for products. Such heuristics consider product packaging practices, shelf days of supply, retailer shelving practices, or perhaps productivity measures such as profit per square foot, but none take into account both expected inventory holding costs and the expected cost of lost sales.

Several methods for measuring the perceived shortages of inventory have been developed.

For example, U.S. Pat. No. 5,608,621, to Caveney et al. entitled System and Method for Controlling the Number of Units of Parts in an Inventory discusses a system for inventory management. The goal of the system is to optimize inventory based upon a selected inventory investment or service level constraint. In other words, this system optimizes inventory based on either a limited quantity of money or a time period for reordering parts during shortages.

Others have also addressed inventory control. Examples of general relevance include Baker, R. C. and Timothy L. Urban (1988). A Deterministic Inventory System with an Inventory-Level-Dependent Demand Rate,@ *Journal of the Operational Research Society*, 39(9): 823–831; Corstjens, Marcel and Peter Doyle (1981). A Model for Optimizing Retail Space Allocations,@ *Management Science*, 27(7): 822–833; Urban, Glen L. (1969). A Mathematical Modeling Approach to Product Line Decisions,@ *Journal of Marketing Research*, 6(1): 40–47; and, Urban, Timothy L. (1998). An Inventory-Theoretic Approach to Product Assortment and Shelf-Space Allocation,@ *Journal of Retailing*, 74(1): 15–35. The approaches proposed by these authors are of general relevance.

Another approach to inventory management called facing optimization minimizes inventory based on the sum of expected annual inventory holding cost and expected annual cost of lost sales. Inventory holding costs are primarily the opportunity cost associated with having a dollar invested in inventory instead of some other alternative. Inventory holding costs also include other variable costs associated with holding inventory. The expected annual cost of lost sales include the costs associated with shortages or outages of a particular item.

As more space or facings are given to a particular item or stock-keeping-unit (a.k.a., SKU), the inventory of the SKU increases as does the physical space required to store the SKU in the facility (i.e., the shelf, warehouse space, etc.). Also, as the inventory of a particular SKU increases, the probability of a shortage or stockout during a given period of time decreases but the required annual shelf inventory level increases. Lower stockout probabilities translate into lower expected annual cost of lost sales. In a space-unconstrained environment, it would be optimal to select the number of facings that minimizes the expected annual cost of lost sales plus the expected annual inventory holding cost. However, in most cases there is a fixed amount of space available for inventory. Consequently, it is necessary to find the number of facings for each SKU that minimizes the total cost of expected annual cost of lost sales and expected annual inventory holding cost for all SKUs in total.

Thus, a need exists for an improved inventory control system. In particular, an improved system that minimizes inventory based on the sum of expected annual inventory holding cost and expected annual cost of lost sales would be desirable.

The present invention addresses the above referenced need. In an exemplary embodiment, the system includes a bank of memory, a processor, an input and an output, and a computer program. The system optimizes inventory or store facings using various data and extrapolated computations. The system optimizes inventory using facing optimization. As mentioned previously, facing optimization is an approach to shelf inventory management that minimizes the sum of expected annual cost of lost sales and expected annual inventory holding cost.

The process of facing optimization requires the assimilation of relevant data for each particular item to be evaluated. The data to be collected include store-level point-of-sale (a.k.a., POS) data, frequency of shelf replenishment, shelf-level order cycle time, space available, space required per SKU, number of units per facing, cost to the retailer of one unit of SKU, price they sell it for, the inventory holding cost factor, and the unit cost of a lost sale. Store-level POS is used to measure the mean of daily sales and the variability of daily sales (a.k.a., standard deviation of demand). The system evaluates these variables when determining the optimal solution for an unconstrained space or a constrained space of a particular facility.

In another exemplary embodiment, the present invention also further evaluates the cost of a shortage or stockout per unit. When determining the cost of a stockout, the system may utilize either a default value or another value set by the user. The potential values that may be set by the user can represent historical costs or possible consumer reactions to the shortage (including switching to different leaving the store, shopping there less frequently, or never shopping there again). The percentage of customers who take each of these actions can be determined by marketing research or through logical discourse or through archival data. The default can be the margin of the item to approximate the unit cost of a lost sale.

In yet another exemplary embodiment, the present invention also evaluates sales variability. This variable can be important if two SKUs have the same days-of-supply (a.k.a., DOS, calculated by taking the inventory level and dividing it by the volume of sales per day) on the shelf. The SKU with the higher sales variability will have a higher probability of stockout.

In yet another exemplary embodiment, the system may be used to calculate the average daily demand for items with demand that is dependent on the number of facings for efficient assortment.

Thus, a principal object of the present invention is to provide an improved system for optimizing and controlling inventory.

A basic object of the present invention is to provide an inventory optimization system that optimizes inventory using facing optimization.

Another basic object of the present invention is to provide an inventory optimization system that minimizes the sum of expected annual cost of lost sales and expected annual inventory holding cost.

Another object of the present invention is to provide a system that evaluates the cost of a shortage when determining optimal inventory.

Yet another object of the present invention is to provide a system that optimizes inventory for an unconstrained space.

Yet another object of the present invention is to provide a system that optimizes inventory for a constrained space.

An object of the present invention is to provide an inventory optimization system that evaluates sales variability.

Another basic object of the present invention is to provide a facing optimization system that can also be utilized to evaluate new products and/or remove existing products from inventory.

BRIEF DESCRIPTION OF THE DRAWINGS

FIG. 4 is an illustration of a representative graphic user interface used for performing an unconstrained optimization to determine the absolute lowest cost solution.

Figure 5:
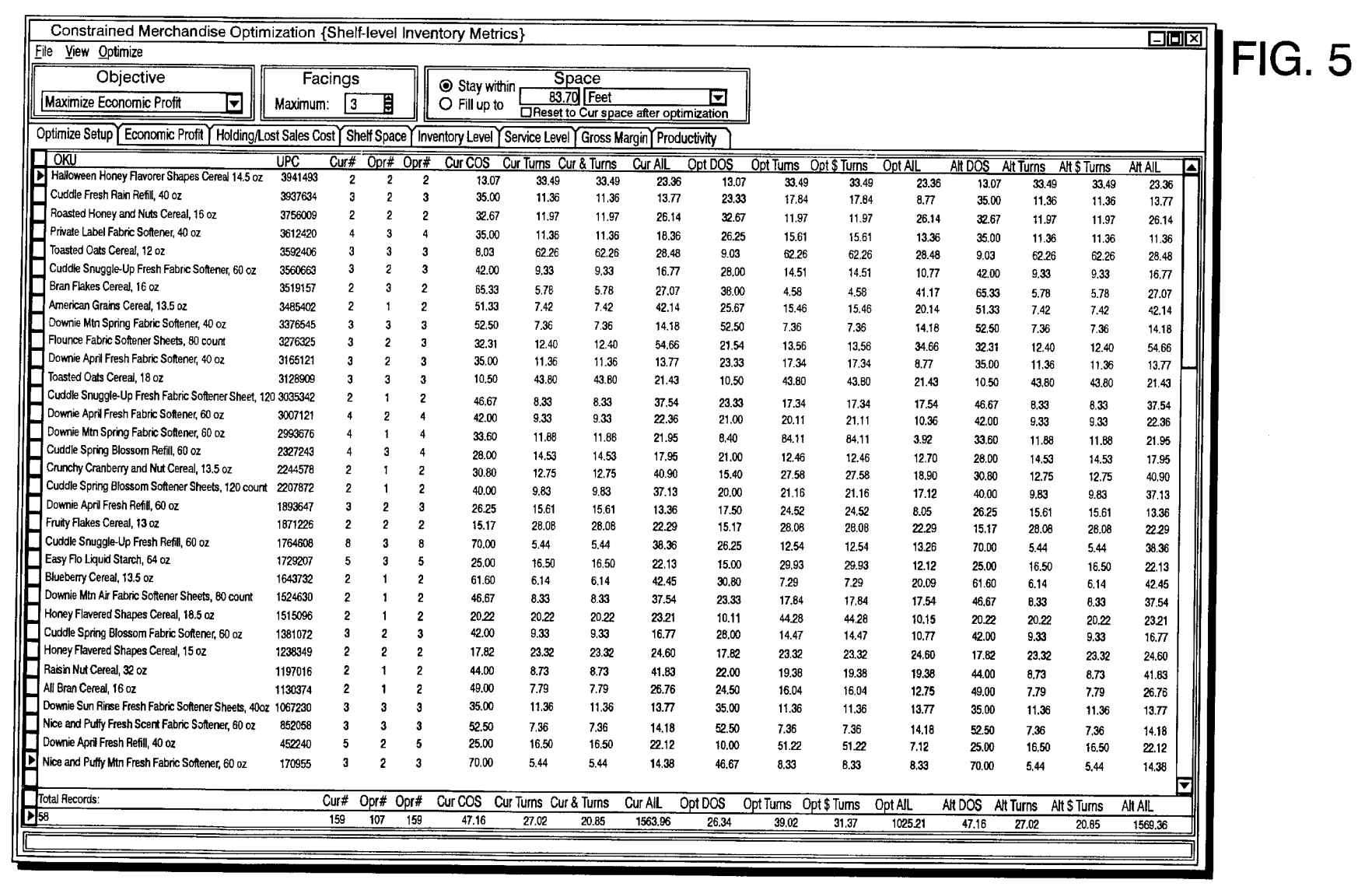

FIG. 5 is an illustration of a representative graphic user interface used for performing a constrained optimization to determine the lowest workable solution, lowest cost solution.

At the outset it is important to note that the subject invention may be practiced in a client service configuration, a main frame terminal configuration, or a personal computer network configuration including, but not limited to, wide area networks, local area networks, campus area networks, or indeed any combination thereof. All such configurations are well known by those reasonably skilled in the art.

Figure 1:
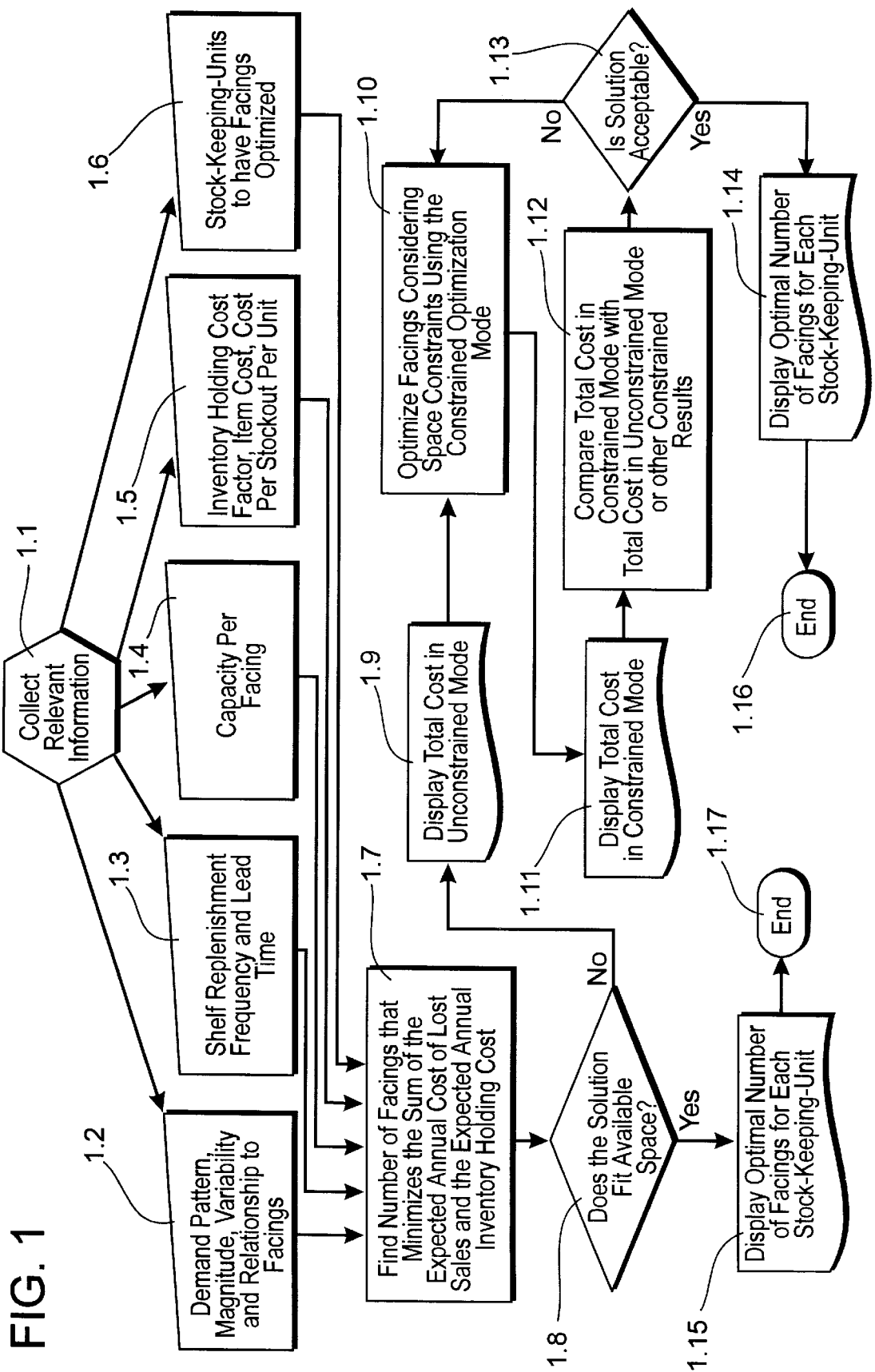
FIG. 1 is a logic flow diagram illustrating the general operation of the instant invention.

FIG. 1 is a logic flow diagram illustrating the general operation of the instant invention. The first step in performing the optimization is to collect the relevant information necessary for the optimization process 1.1. Such relevant information includes but is not limited to determining the demand pattern, magnitude, variability and relationship to the number facings 1.2, determining shelf replenishment frequency and lead time 1.3, determining the capacity per-facing 1.4, determining inventory holding cost factor item, item cost, cost per stock out per unit 1.5, and, without limitation, determining stock-keeping-units to have facings optimized 1.6.

Having determined and collected the above stated information the next step in the optimization process is to find or determine the number of facings that minimizes the sum of expected annual costs of lost sales and the expected annual inventory holding cost 1.7.

Having once made the determination of finding the applicable number of facings that minimizes the sum of expected annual cost of lost sales and the expected annual inventory cost 1.7, the next step in the optimization system is to query whether the solution provided fits the available space for such facings 1.8. Should the solution provided not fit the available space, the next step in the system is to display the total cost in an unconstrained mode 1.9.

Once the total cost associated with the unconstrained mode has been determined the system next optimizes facing considering space constraints using the constrained optimization mode 1.10.

Having optimized facings based on the constrained optimization mode, the system next displays the total cost based upon the constrained optimized mode 1.11 and then compares total cost in constrained mode with total cost in unconstrained mode or other constrained results 1.12. Once the total cost in constrained mode has been compared with total cost in unconstrained mode or other constrained results determination has next made us to whether the solution is acceptable 1.13. If the solution is found to be acceptable the optimal number of facings for each stock keeping unit is displayed 1.14 and the process reaches a normal conclusion 1.16.

Should the solution provided by comparing total cost in constraied mode with total cost in unconstrained mode or other constrain results 1.12 be found not acceptable, a looping process is initiated whereby the next step in the system's execution would be to optimize facings considering space constraints using the constrained optimization mode 1.10 displaying the total cost in constrained mode 1.11, comparing the total cost 1.12 and again testing for the acceptableness of the solution 1.13. This process is repeated until an acceptable solution is reached 1.13 and it is displayed 1.14 and the system is allowed to terminate normally 1.16.

In determining whether the solution fits the available space 1.8, should the system find that the solution does fit the available space, the optimal number of facings for each stock keeping unit is displayed at that point 1.15 and the system terminates normally 1.17 thus bypassing any need to calculate and display total cost in the constrained optimized mode 1.10, 1.11.

The major object of the present invention is to solve for the product set that offers the lowest possible Inventory Holding Cost (IHC) and Expected Lost Sales Cost (LSC) for the set of products being analyzed. This process is performed in both unconstrained and constrained modes. In the unconstrained mode, the solution that is provided does not take into account physical space constraints. In the constrained mode, the solution that is provided takes into account the amount of available shelf space for the product set. In either mode, the proposed optimal solution is expressed in numbers of facings of the products or in optimal shelf inventory level. Comparisons between the current number of facings and the optimal number of facings by product yield cost savings of the proposed set of products over the current set of products.

The process of the present invention requires data collection: store-level point-of-sale (a.k.a., POS) data, frequency of shelf replenishment, shelf-level order cycle time, space available, space required per SKU, number of units per facing, cost to the retailer of one unit of SKU, product price, the inventory holding cost factor, and the unit cost of a lost sale. Store-level POS is used to measure the mean of daily sales and the variability of daily sales (a.k.a., standard deviation of demand). The software takes all of these variables into consideration in finding the optimal solution. The following specifies the direction of the relationship between each of the variables and the required number of facings.

Positive mean of POS
Positive standard deviation of POS
Negative frequency of shelf replenishment
Positive shelf-level order cycle time
Negative number of units per facing
Negative cost to the retailer of one unit of SKU
Positive price they sell it for
Negative inventory holding cost factor The present invention also calculates the cost of a stockout per unit. It does this by considering consumer reactions to stockouts such as switching to different brands, sizes or leaving the store, shopping there less frequently, or never shopping there again. The percentage of customers who take each of these actions can be determined by marketing research or through logical discourse or through archival data. Or the user can simply use margin as an approximation to the unit cost of a lost sale. The present invention takes into account sales variability. This is a critical variable to consider because two SKUs can have the same days-of-supply (a.k.a., DOS, calculated by taking the inventory level and dividing it by the volume of sales per day) on the shelf and the one with the higher sales variability will have a higher probability of stockout.

Facing Optimization

Facing optimization is an approach to shelf inventory management that minimizes the sum of expected annual cost of lost sales and expected annual inventory holding cost. Inventory holding costs are primarily the opportunity cost associated with having a dollar wrapped up in inventory instead of some other alternative. Consequently, there needs to be a good return to inventory—i.e., higher sales or fewer lost sales. Inventory holding costs also include all other variable costs associated with holding one unit of inventory.

Unconstrained Optimization

As more facings are given to a particular stock-keeping-unit (a.k.a., SKU), more inventory is allocated to the shelf. As SKU inventory is supplemented, the probability of a stockout in a given period of time decreases but the excepted annual shelf inventory level increases. Lower stockout probabilities translate to lower expected annual cost of lost sales. In an unconstrained environment, an optimal result and object of the present invention is to select the number of facings which minimize the expected annual cost of lost sales plus the expected annual inventory holding cost. Consequently, the invention provides for this selection in its unconstrained routine.

Constrained Optimization

However, in most cases there is a fixed amount of space available for a particular category. Consequently, it is necessary to find the number of facings for each SKU in a category that minimizes the total cost of expected annual cost of lost sales and expected annual inventory holding cost for all SKUs in total. This is the constrained optimization, as provided for by the instant invention. An illustration of a representative GUI for performing a constrained optimization is provided as FIG. 5.

Data Requirements

The process of facing optimization requires data collection: store-level point-of-sale (a.k.a., POS) data, frequency of shelf replenishment, shelf-level order cycle time, space available, space required per SKU, number of units per facing, cost to the retailer of one unit of SKU, unit and the inventory holding cost factor. Store-level POS is used to measure the mean of daily sales and the variability of daily sales (a.k.a., standard deviation of demand). The present invention considers all these variables when solving for the optimal solution.

Relationships

The following specifies the direction of the relationship between each of the aforestated variables and required number of facings. A positive relationship suggests that the higher the value, the higher the potential cost of lost sales and/or inventory holding costs. A negative relationship means that the higher the value, the lower the potential cost of lost sales and/or inventory holding costs.

Positive . . . Mean of POS in units (average demand)
Positive . . . Standard deviation of POS
Negative . . . Frequency of shelf replenishment
Positive . . . Shelf-level order cycle time
Negative . . . Number of units per facing
Negative . . . Cost to the retailer of one unit of SKU
Positive . . . Price they sell it for
Negative . . . Inventory holding cost factor The Cost of a Stock out The present invention also calculates the cost of a stock out per unit. It does this by considering consumer reactions to stock outs such as switching to different brands, sizes or leaving the store, shopping there less frequently, or never shopping there again. The percentage of customers who take each of these actions is ascertained by marketing research or through logical discourse or through archival data. The present invention can be tailored to use any one of the following four methods of stock out cost per unit: cost of a stock out per unit based on consumer reactions to stockouts, gross margin (the default), contribution margin (gross margin less activity costs), a user-supplied cost of stockout number.

Sales Variability

The present invention takes into account sales variability as it is a critical variable to consider because two SKUs can have the same days-of-supply (a.k.a., DOS, calculated by taking the inventory level and dividing it by the volume of sales per day) on the shelf and the one with the higher sales variability will have a higher probability of stockout.

Conducting The Invention's Optimization Process

For the typical retailer or supplier, the category of items in the analysis will have an associated business objective: driving sales throughput or units sold, creating revenue, creating profit, creating margin, or reducing cost. Depending upon the purpose of the category of products in the analysis, the user will pick the associated objective from a list: Maximize Economic Profit, Minimize Total Cost, Maximize Units Sold, Maximize Sales, or Maximize Gross Profit. At least one of these objectives must chosen for the analysis. Such selection is provided for, without limitation, by a Graphic User Interface (GUI) as illustrated for purpose of example in FIG. 2.

The objective options presented to the user are hard-coded into the application. The set of objectives are presented in a drop-down list-box component and the user must make a selection from the list that is provided. The selection of one of these objectives is a decision of the user. The system does not provide any assistance to the user in making the selection.

The data required for the analysis is collected in an appropriate spreadsheet prior to running an optimization in either a constrained or unconstrained. Spreadsheets assembled using Microsoft Excel have been found to work well but other programs can be used. The database requires one row per SKU. Other data elements may be required depending upon the parameter settings of the optimization.

Item identifier
UPC Code for the item
SKU description or name
Internal item number
Brand of product
Manufacturer of product
Product description
Product size (weight, count, etc.)
Product category
Product segment
Product sub-segment within segment
Product location identifier
Product location name
Start date from which measurements were taken for this item
End date to which measurements were taken for this item
Description of season (may select from a list of seasons or enter a freeform text)
Current status of item (current, delisted, planned, etc.)
Force the system to keep or delete this item
Force the system to fix an item to a particular number of facings regardless of the optimum
Fixed facing number
Force the optimizer to fix an item to a minimum Days of Supply (DOS)
Minimum DOS number
Force the system to fix an item to a maximum DOS
Maximum DOS number
The number of items in a case/inner pack
Force the system to fix facings to a minimum number of cases or innerpacks
Minimum case pack/inner pack number
Average daily demand (in units)
Standard deviation of demand (in units)
Time between replenishments or replenishment frequency
Lead time (from time product is ordered to the time items are placed on the shelf)
Holding capacity per facing
Inventory holding cost percent
Cost of the item (retailer's cost)
Price of the item (retailer's selling price)
Unit-level stockout cost (calculated by the system using specified stockout costing method)
Stockout costing method (GM method, CM method, KM method, or ELSC method)
Width of the item
Height of the item
Current number of facings
Optimal number of facings (calculated by the system)
Factor to use when calculating stockout cost (SOC) by the GM method
Factor to use when calculating SOC by the CM method
Factor to use when calculating SOC by the ELSC method
Distribution Center (DC) labor costs allocated to the item
DC Inventory costs allocated to the item
DC Occupancy costs allocated to the item
DC to Store transportation costs allocated to the item
Store labor costs allocated to the item
Store inventory costs allocated to the item
Store occupancy costs allocated to the item
Contribution margin (calculated by the system using allocated costs)
Percentage of consumers who will switch brands when confronted with a stockout
Percentage of consumers who will switch products when confronted with a stockout
Percentage of consumers who will switch sizes when confronted with a stockout
Percentage of consumers who will not purchase the item when confronted with a stockout
Percentage of consumers who will go to a competitor when confronted with a stockout
Percentage of consumers who will never buy the item again when confronted with a stockout
Percentage of consumers who will shop the store less frequently when confronted with a stockout
Percentage of consumers who will never shop the store again when confronted with a stockout
Margin of the "other brand" when a consumer switches to another brand
Margin of the "other product" when a consumer switches to another product
Margin of the "other size" when a consumer switches to another size
Average profit per basket for shoppers at the retail store
The retailer's Required Rate of Return (RRR) for inventory purchases
The average number of shopping trips taken by the shopper to the retail store
The percentage of shopping reduction that occurs when a consumer shops the store less Known stockout cost The above data elements are collected by the user in a spreadsheet or flat file (comma or tab-delimited) for input into the process database. There will be one record per item with as much data as desired by the user filled in. Specific column names are not required, nor are specific column locations for the data elements in the spreadsheet or flat file. The columns of data can be in any order as the import function maps the spreadsheet/file columns to database fields in the import step.

Import the necessary data into the database. The import function without limitation, consists of selecting the import file created in the immediately preceding step, performing column-to-field mapping, indicating any required data transformations to be conducted during the import, indicating the method for adding records (how to deal with duplicates), and initiating the import process.

The import process reads each record in the input file, applies the data transformations, and appends (or updates) the record in the database. The database into which the records are imported is not unique to the design. The present invention uses a PC-based SQL-capable database to store the data, but other databases may be used. An example of a GUI provided by the instant invention is provided for reference as FIG. 3.

Data may be transformed during an import or after the data have been imported into the process database. Data transformations include: 1) converting weekly average demand to daily average demand, 2) converting a weekly standard deviation of demand to a daily standard deviation of demand, and 3) calculating an estimated standard deviation when the demand variability is unknown from a weekly distribution of sales by day of the week.

Filter the database to perform an analysis on a subset of the data elements imported. Prior to submitting the data for an optimization, the user may choose to filter the database to obtain a set of items for the analysis. In actuality, the data has already been filtered for the user so that the user can only see items that have been authorized for him/her to see based on the user's ID and company information. The further selection of items from the database is accomplished by allowing the user to enter simple SQL select statements to narrow down the items available for the analysis. Specific descriptive data elements may be used in a "where▲" clause of the SQL select statement to filter the database. Records are filtered in this manner based on UPC codes, From/To dates, season descriptors, category/segment/subsegment descriptors, etc.

Perform an Unconstrained Optimization to determine the absolute lowest cost solution. An example of a GUI provided by the instant invention to effectuate an unconstrained optimization is provided for reference as FIG. 4.

Perform a Constrained Optimization to identify lowest cost, highest economic profit, highest units sold in a year, highest sales dollars in a year, or highest gross margin dollars in a year facing presentation for a given linear shelf space. An example of a GUI provided by the instant invention to effectuate a constrained optimization is provided for reference as FIG. 5.

Following the unconstrained merchandise optimization analysis, the user may choose to conduct a constrained merchandise optimization. The constrained merchandise optimization allows the user to implement the following "global" constraints (applicable to all items in the analysis):

Max Facings: the solution will contain no more than max facings.

Max Shelf Space: The solution will 1) "Stay within" the indicated shelf space maximum and will occupy only the amount of shelf space that is optimal up to the max shelf space, or 2) will "Fill up To at Least" the maximum shelf space indicated. In the first case, the solution will not exceed the Max Shelf Space setting. In the second case, the solution will fill up the shelf space, hitting the Max Shelf Space amount as a minimum. If the set is constrained by space, the optimal solution may exceed the Max Shelf Space parameter. If the set is not constrained by space, the optimal solution will fill up the available space.

The user may also choose to specify item-level constraints for the analysis. These constraints must be specified prior to the optimization:

Keep/Delete: The item should be forced to be kept or deleted from the resulting set Fix Facings: The item should be forced to be set to a specific number of facings Min DOS: The item should be forced to be set to a number of facings that yield shelf quantities greater than a minimum DOS Max DOS: The item should be forced to be set to a number of facings that yield shelf quantities less than a maximum DOS Pack or Innerpack Quantity: The item should be forced to be set to a number of facings that satisfy a minimum number of cases or inner packs on the shelf The constrained analysis process uses linear programming to determine the optimal product set which satisfies the constraints (global and item-level) applied by the user. The process flow for the constrained merchandise optimization:

Creating the Import Worksheet

The typical spreadsheet will have one row per SKU and some number of columns selected from the list above. Each column may be labeled with a column header in row 1 and the header for each column is any text that describes the content of the column. While the import capability provides an easy way to get a large amount of data into the database easily, data does not have to be imported. Rather, it can be manually added to the database one SKU at a time using the Item Database functions.

Importing the Data from the Spreadsheet

From the main screen, select the Tools/Import Data/SKU Information menu option which brings up the Import SKU screen. Use this screen to identify the name of the Microsoft Excel workbook, to select the spreadsheet holding the data, and to align the columns of the spreadsheet with the database fields prior to performing the actual import. Before importing the data from the spreadsheet, make sure that the columns in the spreadsheet line up with the fields of the database. Click on a field in the right (white) list box and drag it up or down until it is in line with the corresponding field in the database then drop it to reposition it. All columns (right white list box) should line up with all data fields (left gray list box). When you are finished, select the Import menu item to import the data. The import will either update an existing record if a match is found or will skip the update and only insert new items depending upon the option selected on the screen.

Modifying the Records

Once the items have been imported, you can use the Item Database editor to modify any of the data elements for each record. From the Main Screen, select File/Item Database to bring up the editor. This screen is divided into two sections. The upper section shows the rows in the database and provides a toolbar to use to navigate up and down, insert, delete, and post changes to the database. The lower section is a series of two tab sheets showing different fields for the selected record.

The first tab sheet labeled Item Description & Movement shows descriptive information for the SKU. Fields are provided for Category, Segment, and Subsegment, UPC, brand, and manufacturer, as well as information about the current inventory levels, replenishment practices, and item level costs and holding costs. Providing product dimensions on this screen allow the system to show the shelf space required for different facing levels.

The second tab sheet, Stockout Costing Method, allows the user to indicate the desired method for calculating the cost of a stockout. Four methods are provided for calculating the cost of a stockout. The first, Gross Margin, assumes the cost of a lost sale is the profit of the item. This is a conservative approach to costing stockouts as it does not take into account the future effect on the consumer of being out of stock nor does it accommodate the user opting to switch to an alternative when confronted with a stockout.

The second method, Contribution Margin, is generally even more conservative than the Gross Margin since it uses the Contribution Margin of the item (Gross Margin less activity costs allocated to the item).

The third method, Other Margin, allows the user to specify any dollar amount desired for the cost of a stockout. This method allows a user to employ a particular known stockout cost in the calculation.

The final method, Expected Cost of Lost Sales, seems considerably more complex than the others because of the number of fields provided, but it actually easy to comprehend. This method allows you to use your consumers' known behaviors when confronted with stockouts to accurately calculate the cost of a stockout. By specifying the percentages of consumers who switch to an alternative, delay purchase, or go to competitors for the item, you can calculate the expected cost of a stockout in this item to use in the analysis. In most cases, this method will yield higher stockout costs than either the Gross Margin method or the Contribution Margin method.

Selecting Records (Filtering the Database) prior to an Unconstrained Optimization Two optimization models are available in the system. The Unconstrained Optimization will return the absolute lowest cost solution for the SKUs in the analysis. In many cases, this solution is unworkable since it does not take into account the amount of shelf space available for the items. The solution it returns may not fit in the available shelf space. This analysis is useful for determining the low benchmark for each item. It represents the solution which has the lowest possible cost of lost sales and the lowest inventory holding costs without regard to the available shelf space. Before an optimization is performed, you should filter the database to include only those items that are relevant for the analysis. The system provides a SQL command generator for this purpose. Use the fields on the screen to create a selection criterion ("Shelf=1") and then press the Add button to add the criterion to the criteria listbox. Multiple criteria may be selected and combined with AND and OR. The Delete button deletes the line under the cursor. The Clear button clears all criteria (which has the effect of selecting all the records). The Open and Save buttons allow you to save and recall queries. When your criteria statements are complete, press the Apply button to execute the selection. The system records the number of items selected when it completes the selection. When you close this screen, the selected items are presented in the Unconstrained Optimization screen and you are poised to conduct an unconstrained optimization.

This optimization employs a "brute force" method for determining the optimal number of facings. For each record, the system determines the economic profit or the total cost for 1, 2, 3, etc. numbers of facings. At each step the system checks to see if the total cost increases by incrementing the number of facings by one or if the economic profit decreases by incrementing the number of facings by one. If so, then the system stops and returns the current number of facings as optimal. The optimization process continues with the next record until the end of the database is reached.

The following data elements are used in this segment to calculate the matrix:
ADD Average Daily Demand
    Demand for the product over some period divided by the number of days in the period
    (Demand per period)/(Days in Period)
SDD Std Deviation of Demand
    A statistical measure of the variation of demand over a period of time
    The squared sum of the deviation of each item from the mean divided by the number of items minus one.
    $\Sigma$ (Mean of Demand–Demand)$^2$/(N–1)
TBR Time Between Replenishment
    The frequency of replenishment in days
    How often is this item ordered?
LT Lead Time
    Lead time in days
    How long between the order time and the time the item is out on the shelf?
HCPF Holding Capacity per Facing
    How many items can fit in a facing?
    It takes into account stacked items, too.
HCF Holding Cost Factor
    The capital cost of inventory purchases as a percentage.
    This is the retailer's Holding Cost percent.
Cost Cost
    The price the retailer paid for the item.
Price Price
    The price the consumer pays for the item.
Margin Gross Margin
    The profit made by the retailer on the item.
    (Price–Cost)
EProfit Economic Profit
    The true economic profit made by the retailer on the item.
    If CM is the SOC Method:
        ((ADD*365)*CM)–Tcost
    If GM, KM, or ELSC is the SOC Method:
        ➢ ((ADD*365)*Margin)–TCost The following metrics are calculated and displayed in a grid for the user to view and/or print. Refer to the definitions above for information about the data elements used in the formulas.
Lost Sales Cost of a Lost Sale
    The true cost of a stockout
    Initialink provides 4 stockout costing methods:
        GM Loss is simply the Margin of the item
        CM Loss is the the Contribution Margin
        ELSC Loss is the Expected Cost of Lost Sales per unit
        KM Loss is some known amount
GM Gross Margin
    The margin of the item (Price–Cost)
    The GM can be multiplied by a factor to increase or decrease stockout cost by GM
CM Contribution Margin The margin of the item less activity costs allocated to the item (Activity Based Costing). CM is basically a P&L for each item.

Activity costs allocated to items include:
DC Labor
DC Occupancy
DC to Store Transportation Costs
Store Labor
Store Occupancy
Etc.

The CM can be multiplied by a factor to increase or decrease the stockout cost by CM.

ELSC Expected Cost of a Lost Sale per Unit
This metric takes into account the behavior of consumers when confronted with a stockout.
It is the sum of expected values for each of eight consumer responses to a stockout.
The eight reactions include:
➢ Switch to another product
➢ Switch to another size
➢ Switch to another brand
➢ Do not purchase today
➢ Go to a competitor for the item
➢ Never purchase the item again
➢ Shop the store less frequently
➢ Never shop the store again
For each-item, the percentages of consumers who will take each of these actions is multiplied by the cost of the action. ELSC is the sum of these costs.
The ELSC can be multiplied by a factor to increase or decrease the stockout cost by ELSC.

KM Known Stockout Cost
If the supplier/retailer has a known stockout cost, it can be used in calculation of Lost Sales Cost per unit SOC Stockout Cost
Uses the stockout costing method for the item to calculate the stockout cost
SOC is one of the following . . .
➢ GM*GM Factor
➢ CM*CM Factor
➢ ELSC*ELSC Factor
➢ KM UnitsLostYr Units Lost per Year
The expected number of units lost per year based on the ability of a particular number of facings of the item to support yearly demand.
$(365/TBR)*((ADD*TBR)-(HCPF*NumFacings))$
$(365/TBR)$ is the number of order cycles per year
$(ADD*TBR)$ is the demand per order cycle
$(HCPF-NumFacings)$ is the shelf inventory level UnitsSoldYr Units Sold per Year
The expected total units that could be sold per year (not regarding lost sales due to stockouts)
$(ADD*365)$ HCost Holding Cost
The cost of having the product in inventory and all associated costs. Also takes into account the cost of having a dollar tied up in inventory rather than using it for another purpose.
The higher the number of facings, generally, the higher the holding cost.
If SDD>0 then:
$(((ADD*TBR)/2)+(Z*Sqrt(TBR+LT)*SDD))*HCF*Cost$
$((ADD*TBR)/2)$ is cycle stock
$(Z*Sqrt(TBR+LT)*SDD)$ is the safety stock which accounts for demand variation during the lead time.
If SDD=0 then:
$(((ADD*TBR)/2)+(HCPF*NumFacings)-(ADD*TBR))*HCF*Cost$
$((ADD*TBR)/2)$ is cycle stock
$(HCPF*NumFacings)-(ADD*TBR)$ is the amount of inventory on the shelf in excess of the demand during the lead time LSCost Lost Sales Cost
The cost of lost sales based on the user's selection of a stockout costing method.
If number of facings>0 and SDD=0 then:
UnitsLostYr*SOC
If number of facings>0 and SDD>0 then:
$(365/TBR)*SOC*Ez*Sqrt(TBR+LT)*SDD$
$(365/TBR)$ is the replenishments per year
SOC is the stockout cost
$Ez*Sqrt(TBR+LT)*SDD$ is the expected number of units out of stock per replenishment cycle.
This calculation uses a normal distribution (Ez) to determine the expected out of stock units per replenishment cycle.

TotalCost Total Cost
The total cost for the item. Includes holding cost and lost sales costs.
(Hcost+LSCost)

GM$/FT Margin Dollars per Foot
This productivity measure is the margin dollars per linear foot of space
GM Dollars/(Width of item in feet*number facings)

Sales$/Ft Sales per Foot
This productivity measure is the sales per linear foot of space
SalesYr/(Width of Item in Feet*number facings)

DOS Days of Supply
Average number of days of supply on the shelf
(Number of Facings*HCPF)/ADD Z Z value
The Z value is the number of Std Deviations that correspond to some service level percentage
Z may be calculated based on the number of facings or looked up from a table of percentages
$((HCPF*Facings)-((TBR+LT)*ADD))/(Sqrt(TBR+LT)*SDD)$ Ez Unit Normal Loss Integral
A value that corresponds to Z
Used to lookup a Z value from an Ez Table CS Cycle Stock
Amount of inventory required to meet demand during the replenishment cycle
$(ADD/365)*(TBR/2)$ SS Safety Stock
Amount of inventory required to account for demand variability during lead time
If SDD=0 then:
➢ $(HCPF*Num Facings)-(ADD*TBR)$
If SDD>0 then:
➢ $Z*SDD*Sqrt(TBR+LT)$ AIL Average Inventory Level
The average level of shelf inventory
(CS+SS)

GMROI GM Return on Investment
The ratio of an item's GM Dollars to its Average Inventory Level (GMDollars/AIL)
UnitTurns Turns per Year in Units
   The average number of times inventory turns in a year in units
   (UnitsSoldYr/AIL)
DollarTurns Turns per Year in Dollars
   The average number of times inventory turns in a year in dollars
   (UnitsSoldYr*Cost)/(AIL*Cost)
SL% Service Level Percentage
   Generally, SL% is thought of as the probability of being in stock during a replenishment cycle and is computed by calculating Z and looking up the percentage from the normal distribution.
   InitiaLink considers a more appropriate measure of service level to be the percent of demand fulfilled in a year:
   (1−(UnitsLostYr/UnitsSoldYr))*100
GM$ GM Dollars per Year
   Gross Margin Dollars per Year for the item
   Margin*(ADD*365)
GM%GM Percent
   Gross Margin as a percentage
   (Price−Cost)/Cost
CTM Contribution to Margin
   The contribution to margin is a calculation that divides GM% by the percentage of the item sales to total category sales.
   It is the ratio of the product's margin percentage to its sales percentage.
   Margin/(SalesYr/Σ(SalesYr)*100)
CatGM% Category GMPercent
   The category GM percentage is the ratio of the item GM to the overall category GM. It is the percentage that the item generates to the category GM total.
   Margin/Σ(Margin)*100

Before running the optimization, the user may choose to change information in the two columns labeled Cur# and Alt#. These columns reflect the current number of facings and the alternate number of facings. The results of the analysis are presented in the remaining columns. Red columns show the results based on the current number of facings, green show the optimized solution, and purple columns represent the alternate number of facings. After the user selects the Optimize menu item to run the analysis, status information is presented at the bottom of the screen. When the analysis completes, the user can tailor the display to show only the columns related to costs, space, or days of supply to make the results easier to view. The user may also choose to generate and view a report.

To display only columns related to costs, click the tab labeled Holding/Lost Sales Cost. To display only columns related to shelf space, click the tab labeled Shelf Space. To select only columns related to Economic Profit, click the tab labeled Economic Profit. Other metrics are presented on tabs labeled Inventory Level, Service Level, Gross Margin and Productivity.

Comparisons between the current, alternate, and optimal solutions are easy to note by focusing on the colors of the columns. At the bottom of the screen, totals are presented for each column showing the overall costs, space, and days of supply for all items in the analysis.

Constrained Optimization

Unlike the Unconstrained Optimization, the Constrained Optimization takes into account the maximum shelf space allowed for the items and presents the solution that will fit in the space. In many cases, the solution presented will be less than the Unconstrained analysis, but it will be the optimal solution for a given set of constraints. The grid works exactly as described above for the Unconstrained Optimization, and the color coded columns are the same. On the Constrained screen, however, you are asked to indicate the maximum number of facings for the SKUs and the maximum total shelf space prior to the analysis.

The method used to calculate the optimal solution in the Constrained mode is very different from that used in the Unconstrained mode. This method employs complex zero-one Integer Linear Programming to determine the optimal constrained solution. The solution is the best one that fits within the constraints of maximum facings and shelf space.

Efficient Assortment

A constrained optimization for facing optimization can be modified to allow for Efficient Assortment (EA). Our current model for constrained optimization is the following:

Simple Example

| Item | # Facings | Total Cost* | Inches per facing |
|------|-----------|-------------|-------------------|
| A | 1 | x<br>y<br>z | m |
| B | 1 | p<br>d<br>q | n |

Total Inches Available=T
Decision Variables:
   $A_j=0,1$
   $B_i=0,1$

| CONSTRAINED LINEAR OPTIMIZATION | *Other objectives are:<br>Sales revenue<br>Unit sales<br>Gross Margin<br>Economic profit |
|---|---|

Objective Function:
   Min $A_1x+A_2y+ \ldots +B_3q$
Constraints:
Subject to:
   $A_j=0,1$
   $B_i=0,1$
Logical Constraints:
   $A_1+A_2+A_3=1$
   $B_1+B_2+B_3=1$
Space Constraint:
   $1\ mA_1+2\ mA_2+3\ mA_3+1\ nB_1+2\ nB_2+3\ nB_3<=T$
Objective Function:
   Max $P\_\_-\_A_1x-A_2y-\ddot{y}-B_3q$
   Where $P\_=(A_1+A_2+\ddot{y})am_a+(B_1+B_2+\ddot{y})bm_b+\ddot{y}$
   a=gross margin for item A (or contribution margin but not the expected unit cost of a lost sale)
   $m_a$=average yearly demand (in units)
For items that the user will allow to be deleted, the logical constraints should change from
   $A_1+A_2+A_3=1$
to
   $A_1+A_2+A_3<=1$
   $A_1+A_2+A_3>=0$ This new approach does not add any new decision variables but does add one additional constraint for each item that is allowed to be deleted.

For items that are being added, these are simply additional decision variables, like all of the others. The user will need to enter all of the information about these new items that are being considered for addition. If they are using Neilsen data and find that certain items should be considered for adding (the top n items that the retailer isn't carrying), then those items will need one new decision variable for each.

In the Total Cost of inventory equation (TC=IHC+LSC), the stockout cost term may be calculated by one of four different methods: Gross Margin, Contribution Margin, Known Stockout Costs, or Expected Cost of Lost Sales.

The Gross Margin is a commonly used term calculated by taking the difference between the item selling price and the item cost. It represents the gross profit per unit. As a stockout cost constant, the Gross Margin will yield a very conservative estimate of the cost of a stockout. The Contribution Margin is also a commonly used term calculated by subtracting some number of allocated costs from the Gross Margin. As a stockout cost constant, the Contribution Margin will also yield a very conservative estimate of the cost of a stockout. If stockout costs are known, the user may provide a stockout cost constant to use in the calculation of stockout costs.

The final method, Expected Cost of Lost Sales, is a calculated estimate of the cost of a stockout taking into account consumer behavior patterns when confronted with an out of stock item. The following explains the calculation of the stockout cost constant using this method:

1. For each item in the analysis, collect data regarding percentage of consumers who will engage in one of eight possible actions when confronted with a stockout of the item:

| PERCENTAGE WHO WILL . . . | POTENTIAL LOSS/GAIN TO THE RETAILER |
| --- | --- |
| Purchase an alternative product | Difference between profit of out of stock item and alternative item |
| Purchase the same product but in a different size item | Difference between profit of out of stock item and different size item(s) |
| Purchase the same product in a different brand | Difference between profit of out of stock item and different brand item |
| Delay purchase until later | Loss of profit of the item |
| Go to a competitor for the item | Loss of profit of the typical shopper=s basket, not just the out of stock item |
| Shop the store less frequently | Loss of some percentage of profit of typical shopper=s basket |
| Never buy the item again | Loss of profit of the item in perpetuity |
| Never shop the store again | Loss of the total percentage of profit of typical shopper=s basket in perpetuity |

2. Collect the following data for each item in the analysis: profit of the typically chosen "alternative" product, profit of the typically chosen "other size" product(s), profit of the typically chosen "other brand" product, average profit per basket per shopper and the typical reduction percentage for consumers who shop the store less frequently as a result of a stockout (resulting from the retailer/supplier=s required rate of return for financial investments*number of times the average consumer shops the establishment per week).

| 3. For each item in the analysis, calculate the profit loss/gain for each possible outcome: | |
| --- | --- |
| Purchase an alternative product | Difference between profit of out of stock item and alternative item |
| Purchase the same product but in a different size | Difference between profit of out of stock item |
| Purchase the same product in a different brand | Difference between profit of out of stock item and different brand item |
| Delay purchase until later | Profit of out of stock item |
| Go to the competitor for the item | Average profit per basket |
| Shop the store less frequently | Reduction in shopping percentage times profit per basket times average shops per week times 52 |
| Never buy the item again | Profit of out of stock item times average shops per week times 52 divided by required rate of return percentage |
| Never shop the store again | Average profit per basket times average shops per week times 52 divided by required rate of return percentage |

4. Multiply the percentages from step 1 above by the loss/gain for each possible outcome from step 3 and sum the terms to calculate the total expected cost of lost sales for the item. When used in the calculation of LSC, this usually provides a more realistic estimate of stockout costs.

Overview of Process For Replenished Variable Space

In an exemplary embodiment, the process can be used to analyze display promotions that are replenished and season-related variable space that is replenished but not each of these if they are not replenished. For example, if a season-related variable space is replenished over a 2 month period, then, using historical demand and a forecast of future demand, average daily demand would be calculated. The rest of the variables would be included as if fixed space were being optimized. All of the metrics in the fixed space analysis are annualized, therefore, the user would need to consider the metrics proportionally, in accord with the length of the replenishment season. Specifically, the process can be used to optimize variable space that is replenished, along with fixed space.

The first step is to define the season for this collection of SKUs that will be sold through variable space that is replenished. This definition must include the time period to be analyzed. Then, in the merchandise optimization area, the user must go into the data base filter and select the field and the appropriate season or promotional period. Then they must run the optimization engine. The solution will specify how much space will be required. If the amount of variable space is already specified, then constrained optimization must be used, otherwise the unconstrained optimization can be used. For the average daily demand data they will either have to use historical data or a demand planning system.

Whereas, the present invention has been described in relation to the drawings attached hereto, it should be understood that other and further modifications, apart from those shown or suggested herein, may be made within the spirit and scope of this invention.

What is claimed is:

1. An inventory optimization method to enable a user to select products for a space, said method comprising:
   determining at least one optimization analysis objective;
   communicating operationally dependent information about various products and importing said operationally dependent information to an inventory database;
   identifying a subset of data elements within said database on which to perform an optimization analysis and communicating said subset of data elements to an optimizing computer;

performing an optimization analysis upon said subset of data elements using said optimizing computer to thereby obtain an unconstrained report and a constrained report; and, providing said reports to a user to enable the user to select products for the space.

2. The method as recited in claim 1 wherein said method further comprises facilitating multiple user access, viewing and contingent control of said method execution via a computer compatible communications network.

3. The method as recited in claim 1 wherein said at least one optimization analysis objective is chosen from the group including maximizing economic profit, minimizing total cost, maximizing units sold, maximizing sales revenue and maximizing gross margin.

4. The method as recited in claim 3 wherein said at least one optimization analysis objective includes the further step of calculating cost of lost sales.

5. The method as recited in claim 4 wherein said cost of lost sales is determined based upon consumer responses.

6. The method as recited in claim 5 wherein said consumer responses are chosen from a consumer response group including consumers who will go to a competitor, consumers who will never buy the product again, consumers who will never shop the store again, consumers who will make no purchases, consumers who will shop less frequently, consumers who will switch brand, consumers who will switch product, and consumers who will switch size of product or other behavior.

7. A computer readable medium encoded with a computer program for determining optimal space utilization comprising:

a code segment for determining at least one optimization analysis objective;

a code segment for communicating operationally dependent information about various products; and for importing said operationally dependent information to an optimization process database;

a code segment for identifying a subset of data elements within said database upon which to perform an optimization analysis; and a code segment for communicating said subset of data elements to said optimization analysis;

a code segment for performing said optimization analysis upon said subset of data elements to produce an unconstrained and a constrained optimization analysis report that enables a user to utilize the space optimally.

8. The program as recited in claim 7 wherein said importing of operationally dependent information to said optimization process database further comprises:

a code segment to provide for selection of files for import;

a code segment to validate said file selection;

a code segment to perform import data transformations; and a code segment to import said transformed data to said database.

9. The program as recited in claim 7 wherein said identification of said subset of data elements further comprises:

a code segment to display at least a portion of the imported database files; and, a code segment to enable a user to specify which of said data elements are to be filtered for subsequent display and further analysis using said optimization analysis.

10. The program as recited in claim 7 wherein said optimization analysis comprises code segments for performing an unconstrained optimization analysis and a constrained optimization analysis upon said subset of data elements.

11. The program as recited in claim 10 wherein said performance of said constrained optimization analysis further comprises:

a code segment to allow the user to update settings for the optimization and to initiate the optimization process;

a code segment to control the linear programming optimization process; and a code segment to calculate relevant financial and operational metrics.

12. The program as recited in claim 10 wherein said performance of said unconstrained optimization analysis further comprises:

a code segment to allow the user to initiate the optimization process;

a code segment for executing the optimization process; and, a code segment to calculate relevant financial and operational metrics.

13. The program as recited in claim 7 wherein said at least one optimization analysis objective is chosen from an optimization analysis group including maximizing economic profit, minimizing total cost, maximizing units sold, maximizing sales revenue and maximizing gross margin.

14. The program as recited in claim 7 wherein said at least one optimization analysis objective includes the further step of calculating cost of lost sales.

15. The program as recited in claim 14 wherein said cost of lost sales is determined based upon consumer responses.

16. The program as recited in claim 13 wherein said consumer responses are chosen from a consumer response group including consumers who will go to a competitor, consumers who will never buy the product again, consumers who will never shop the store again, consumers who will make no purchases, consumers who will shop less frequently, consumers who will switch brand, consumers who will switch product, and consumers who will switch size of product or other behavior.

* * * * *

UNITED STATES PATENT AND TRADEMARK OFFICE
CERTIFICATE OF CORRECTION

PATENT NO. : 6,341,269 B1
DATED : January 22, 2002
INVENTOR(S) : Earl F. Dulaney and Matthew A. Waller It is certified that error appears in the above-identified patent and that said Letters Patent is hereby corrected as shown below:

Title page,
Item [73], Assignee "Mercani Technologies, Inc., Fayetteville, AK" should read
-- Mercari Technologies, Inc., Fayetteville, AR --
*Attorney, Agent or Firm*, "Hsad, Johnson & Kachigian" should read -- Head, Johnson & Kachigian --.

Figure 1A:
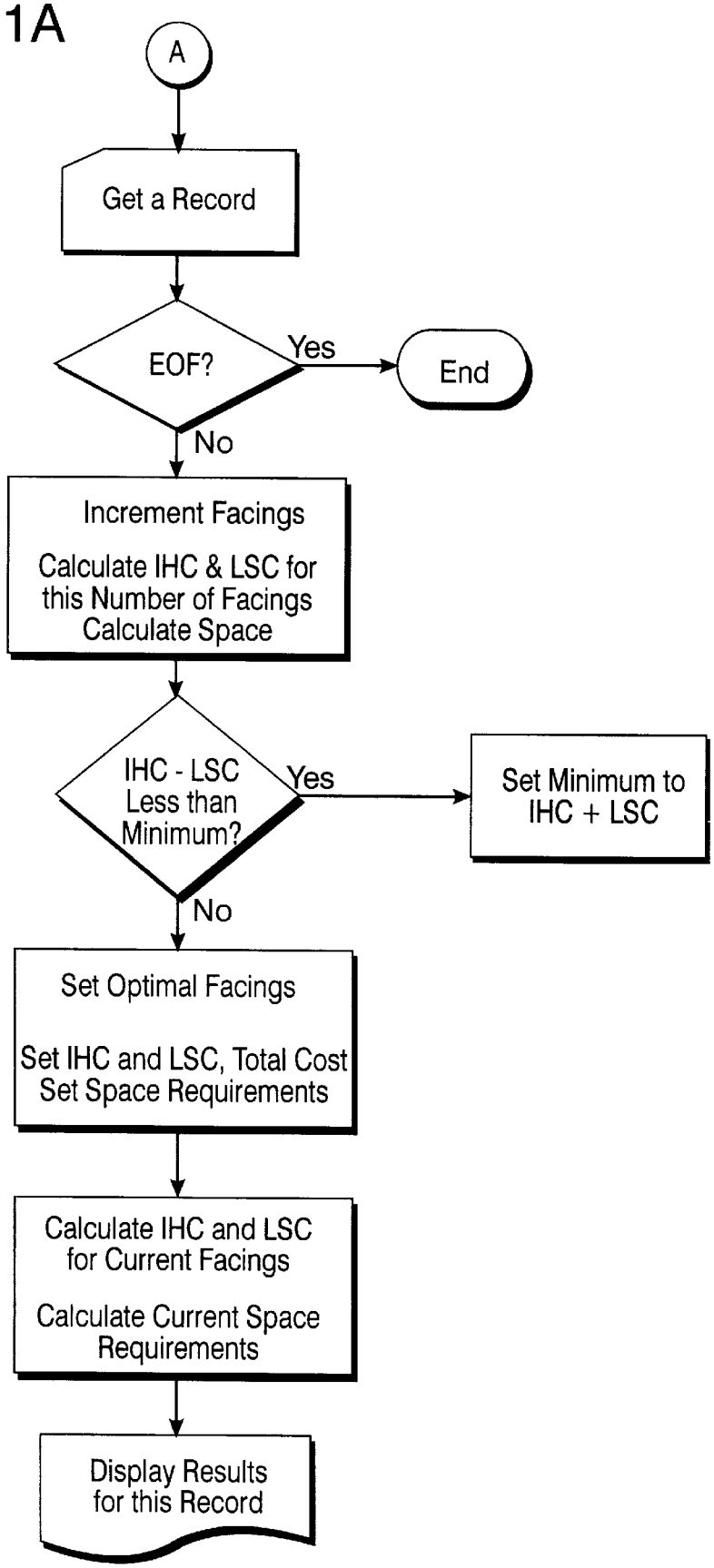
FIG. 1A is a logic flow diagram illustrating a subroutine of the instant invention.

Drawings,
Sheet 2, Fig. 1A, (also shown on the title page) the portion of the flow diagram reading

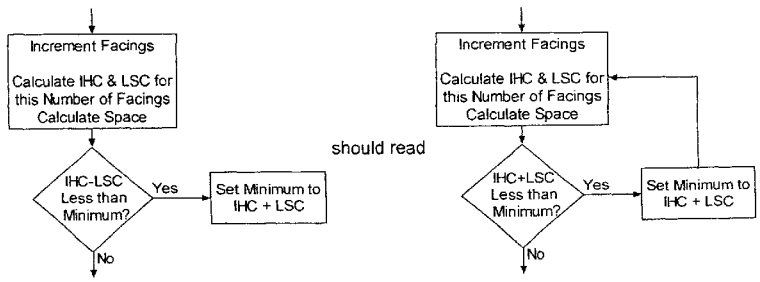

Column 4,
Line 3, "workable solution, lowest cost", should read -- cost, workable --;
Line 20, after "cost factor" cancel "item";
Line 49, replace "has next made us" with -- is next made as --;
Line 55, "constraied" should read -- constrained --;
Line 56, cancel "constrain" and insert -- constrained --.

Signed and Sealed this

Twenty-second Day of October, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,341,269 B1
DATED : January 22, 2002
INVENTOR(S) : Earl F. Dulaney and Matthew A. Waller It is certified that error appears in the above-identified patent and that said Letters Patent is hereby corrected as shown below:

Column 5,
Lines 31 to 42, cancel beginning with "The following specifies" to and including "holding cost factor."

Figure 2:
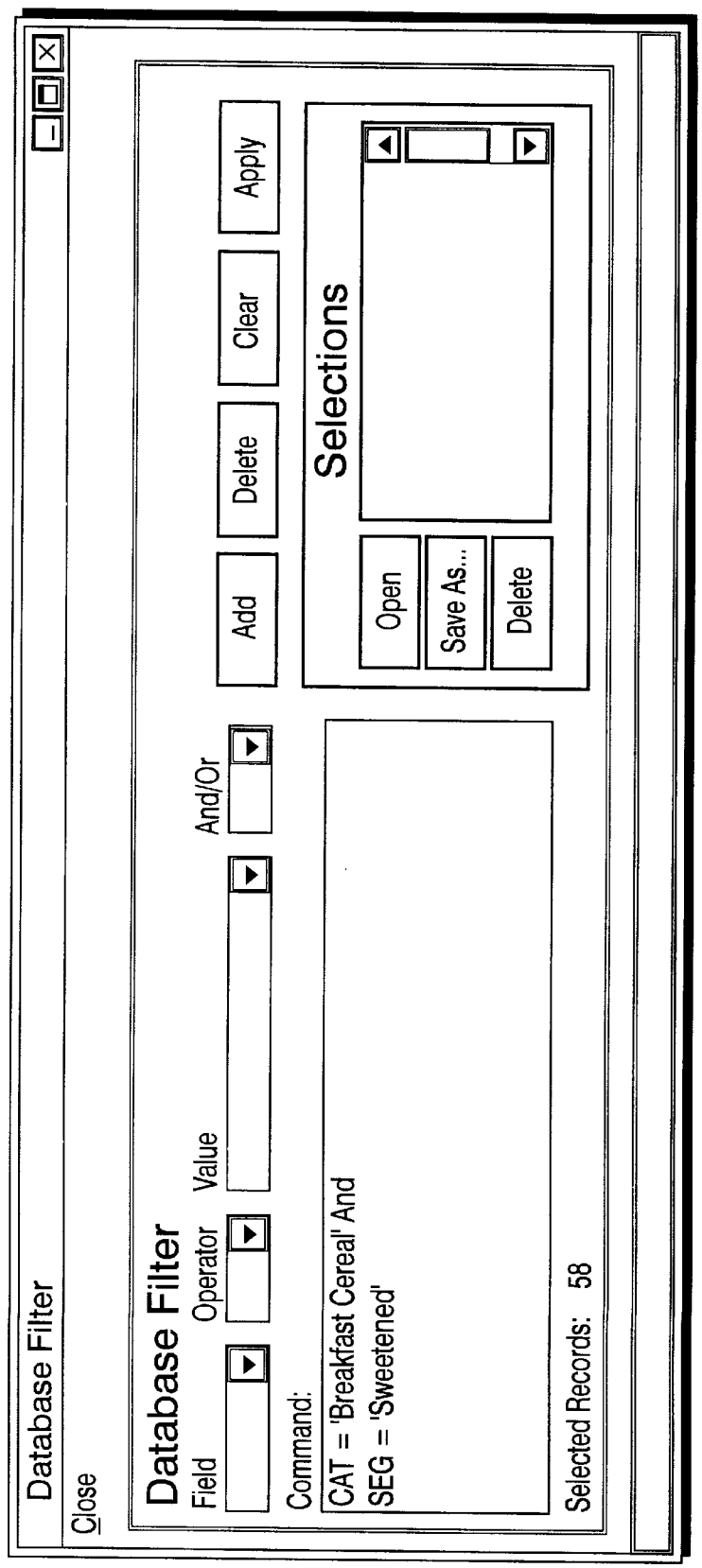
FIG. 2 is an illustration of a representative graphic user interface used for selecting a category, segment or modular section for optimization.

Column 7,
Line 17, "FIG. 2" should read -- FIG. 4 and FIG. 5 --;
Line 27, cancel "a" and after "unconstrained" insert -- mode --.

Figure 3:
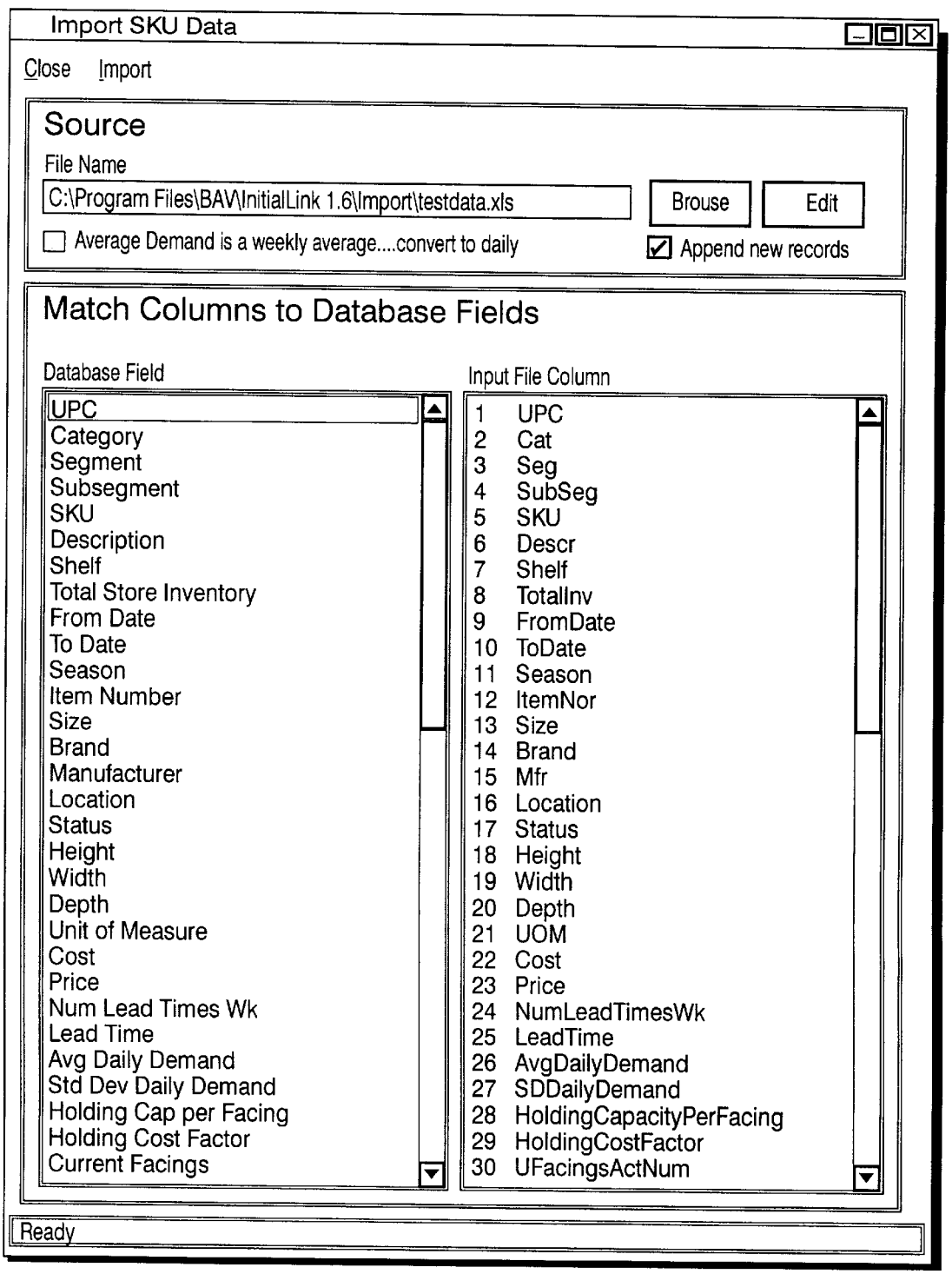
FIG. 3 is an illustration of a representative graphic user interface used for importing data required for the optimization analysis and creating an appropriate spreadsheet.

Column 10,
Line 45, after "screen." and before "Use" insert -- An example of a GUI provided by the instant invention is provided for reference as FIG. 3. --.

Column 11,
Line 54, after "purpose." insert -- An example of a GUI provided by the instant invention is provided for reference as FIG. 2. --.

Column 12,
Line 2, after "facings." insert -- A logic flow diagram of this subroutine is provided as FIG. 1A. --;
Lines 11 and 12, cancel beginning with "this segment" to and including "matrix" and insert -- the optimization --;
Line 59, cancel one occurrence of "the".

Column 13,
Line 52, cancel "(HCPF-NumFacings)" and insert -- (HCPF*NumFacings) --.

Figure 1B:
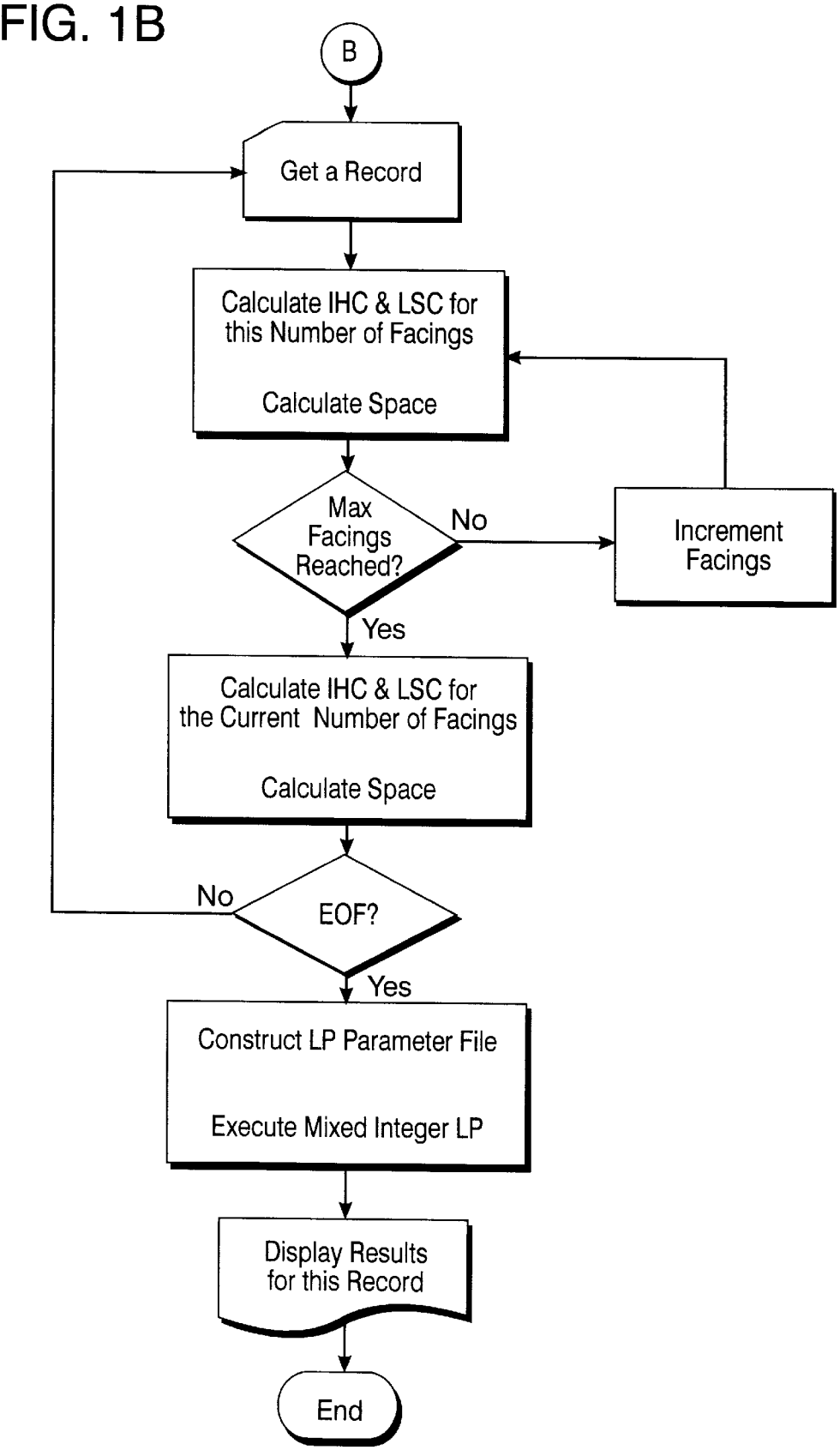
FIG. 1B is a logic flow diagram illustrating a subroutine of the instant invention.

Column 16,
Line 13, after "constrained solution." insert -- A logic flow diagram of this subroutine is provided a FIG. 1B. --;
Line 44, after "Function" insert -- (to minimize cost) --;
Lines 55 to 60, cancel beginning with "Objective" to and including "demand (in units)" and insert the following text:
-- An Alternate Objective Function (to maximize economic profit)
  Max $P-A_1x-A_2y-\ldots-B_3q$
  Where $P=(A_1+ A_2+ A_3)am_a+(B_1+ B_2+ B_3)bm_b$
   a, b=gross margin for item A and B respectively (or contribution margin but not the expected unit cost of a lost sale)
   $m_a$, $m_b$=average yearly demand for item A and B respectively (in units) --

UNITED STATES PATENT AND TRADEMARK OFFICE
CERTIFICATE OF CORRECTION

PATENT NO.   : 6,341,269 B1
DATED        : January 22, 2002
INVENTOR(S)  : Earl F. Dulaney and Matthew A. Waller It is certified that error appears in the above-identified patent and that said Letters Patent is hereby corrected as shown below:

Column 17,
Lines 51 to 56, each occurrence of "shopper=s" should read -- shopper's --;
Line 65, "retail/supplier=s" should read -- retail/supplier's --.

Signed and Sealed this

Twelfth Day of November, 2002

Attest:

JAMES E. ROGAN
Attesting Officer    Director of the United States Patent and Trademark Office